US007103968B2

(12) United States Patent

Karrasch

(10) Patent No.: US 7,103,968 B2

(45) Date of Patent: Sep. 12, 2006

(54) CABLE TERMINATING APPARATUS

(75) Inventor: Christopher J. Karrasch, Boiling Springs, PA (US)

(73) Assignee: Tyco Electronics Corporation, Middletown, PA (US)

( * ) Notice: Subject to any disclaimer, the term of this patent is extended or adjusted under 35 U.S.C. 154(b) by 370 days.

(21) Appl. No.: 10/454,709

(22) Filed: Jun. 4, 2003

(65) Prior Publication Data

US 2004/0244190 A1 Dec. 9, 2004

(51) Int. Cl.
*B23P 19/00* (2006.01)
*B25B 25/00* (2006.01)
*H01R 43/00* (2006.01)

(52) U.S. Cl. ............................ 29/758; 29/747; 29/748; 29/749; 29/750; 29/755; 29/564.4; 29/566.4

(58) Field of Classification Search .................. 29/747, 29/748, 749, 755, 564.4, 566.4, 750, 758; 439/310, 409, 417
See application file for complete search history.

(56) References Cited

U.S. PATENT DOCUMENTS

| | | | | |
|---|---|---|---|---|
| 4,035,897 | A * | 7/1977 | Over et al. | 29/56.6 |
| 4,180,904 | A * | 1/1980 | Nijman | 29/749 |
| 4,349,944 | A * | 9/1982 | Fickes | 29/566.4 |
| 4,429,451 | A | 2/1984 | Angelico | 29/566.4 |
| 4,467,516 | A | 8/1984 | John et al. | 29/566.4 |
| 4,680,852 | A * | 7/1987 | Centore | 29/461 |
| 5,125,150 | A | 6/1992 | Meyer | 29/566.3 |
| 5,457,876 | A | 10/1995 | Gerhard, Jr. | 29/751 |
| 5,528,821 | A * | 6/1996 | Matsuzawa | 29/705 |
| 5,832,603 | A | 11/1998 | Fallandy | 29/861 |
| 5,992,002 | A * | 11/1999 | Hung | 29/566.4 |
| 6,594,888 | B1 * | 7/2003 | Chang | 29/751 |
| 2002/0162212 | A1 * | 11/2002 | Holliday et al. | 29/564.4 |
| 2002/0174538 | A1 * | 11/2002 | Chang | 29/751 |

FOREIGN PATENT DOCUMENTS

| | | |
|---|---|---|
| EP | 1 422 793 A1 | 5/2004 |
| JP | 10-125435 | 5/1998 |

OTHER PUBLICATIONS

Merriam-Webster Online Dictionary Definition of Strip.*

* cited by examiner

*Primary Examiner*—David P. Bryant
*Assistant Examiner*—Sarang Afzali

(57) ABSTRACT

Apparatus and methods are shown for holding a plurality of wires of a cable in fixed positions relative to each other for assisting in the termination of the cable with a connector having plurality of contacts possibly of the insulation displacement type.

20 Claims, 3 Drawing Sheets

CABLE TERMINATING APPARATUS

FIELD OF THE INVENTION

The present invention relates to apparatus for terminating an electrical cable with a connector and methods of performing such a termination.

BACKGROUND OF THE INVENTION

Insulation displacement connection (IDC) cable termination, where the cable contains a plurality of wires, with a connector containing a plurality of terminals, can be difficult to perform, particularly if the cable contains a number of small diameter wires such as the type typically used for telecommunications applications.

Tools for such termination in the prior art typically are impact tools that require inserting wires one at a time into connector terminals, or terminate a number of wires at once. One wire at a time termination is a time consuming operation, and multiple wire termination may cause operator discomfort, because of the stress imposed by impact on those wires. Moreover, since connectors often break, a field replacement operation is often necessary, complicating the termination efforts.

Termination may often also require cutting and/or stripping the wires and/or cable. Using prior art tools to perform the cutting may leave less than a flush cut, leaving wire ends exposed which may touch a shielding or electrically conductive member.

Accordingly, apparatus and methods are needed that improves upon these disadvantages in the prior art.

SUMMARY OF THE INVENTION

The present invention provides apparatus and methods for positioning a plurality of wires of a cable relative to each other and terminating the cable with a connector. Embodiments comprise a support means with positioning means for positioning wires of the cable in a fixed spaced relationship relative to each other and a guide means for engaging a complementary surface of the connector as it engages the device so as to guide terminals of the connector into electrically contacting relationship with the wires.

According to a second aspect of the invention there is provided a method of terminating a cable having a plurality of wires with a connector having a plurality of terminals comprising the steps of:

(i) removing a portion of outer insulation from the cable to expose insulated wires therewithin;

(ii) positioning the insulated wires by engaging them with positioning means of a support means;

(iii) aligning the connector with the support means by engagement of guide means of the support means with a complementary surface of the connector;

(iv) urging the connector further into engagement with the support means and thereby bringing the terminals into contacting relationship with the wires; and (v) removing the support means from the cable terminated with the connector.

BRIEF DESCRIPTION OF THE DRAWINGS

The invention will now be described by way of example only with reference to the accompanying drawings in which.

DETAILED DESCRIPTION OF THE PREFERRED EMBODIMENTS

Figure 1:
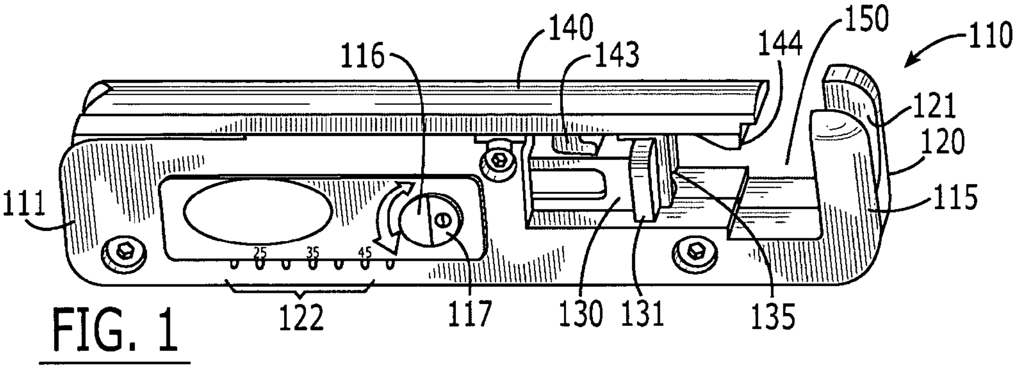
FIG. 1 shows a preferred embodiment.

FIG. 1 shows a preferred embodiment of the invention. A squeezing tool embodiment is shown generally at 110. Also shown is a body 111, comprised of housings 115 and 120. A stripping recess 116 is shown integral to body 111. Contained therein is stripping blade 117, as will be further described below. Measurement scale 122 is also shown, and may be used, inter alia, to determine cable stripping length. Actuation member 130 is seen as well, having associated finger pull 131 and pusher 135.

Handle 140 is shown in closed position. Handle 140 may also be placed in a locking position, if desired, wherein lug 143 of handle 140 engages in mating relationship with actuation member 130. Lug 144 provides a seating engagement for a cable manager, as is further described below. Cable slot 121 provides a pass through for a cable, as well as mating engagement for a cable boss on a cable manager, as will be further described below.

Figure 2:
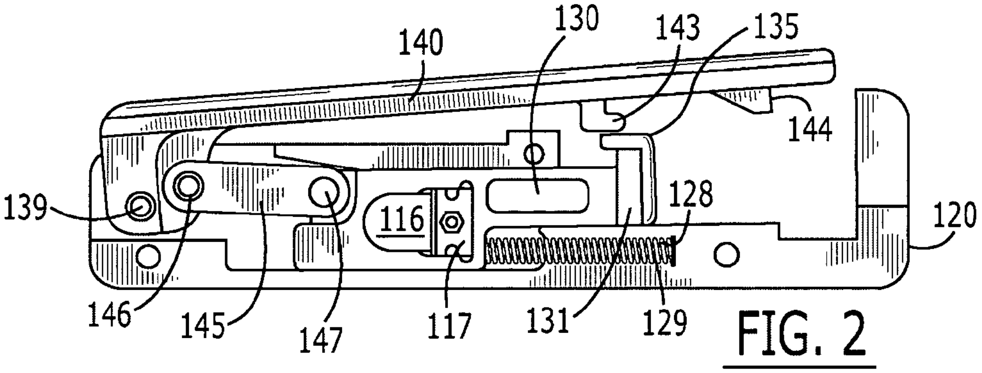
FIG. 2 shows a view of the embodiment of FIG. 1.

FIG. 2 shows the embodiment of FIG. 1 with housing 115 removed and the mounting of various components within a recess in housing 120. Housing 115 has a similar recess (not shown.) Handle 140, retained on anchor pin 139, is eccentrically connected to one end of pivot arm 145 through pivot pin 146. The other end of pivot arm 145 is in contact with actuation member 130 through pivot pin 147. Stripping blade 117 is also seen, mounted within actuation member 130. Compression spring 128 is retained on shaft 129 and engages at one end a surface on actuation member 130, and at the other end, the bottom of a pocket in housings 115 and 120.

Figure 3:
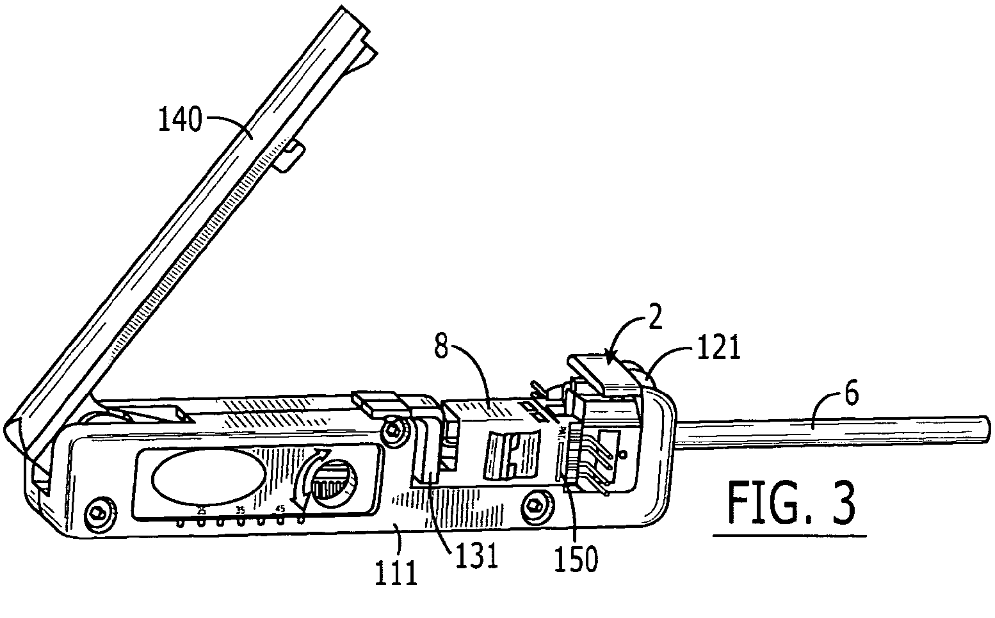
FIG. 3 shows a preferred embodiment.

Turning briefly to FIG. 3, the movement of finger pull 131 (as well as actuation member 130 and pusher 135—see FIG. 1) is seen when handle 140 is raised. The raising of handle 140, and the eccentric movement of pivot arm 145 (shown in FIG. 2) relative to handle 140 about pivot pins 146 and 147 (shown in FIG. 2) results in lateral movement of the finger pull 131 (and associated actuation member 130 and pusher 135—seen in FIG. 1.) The force used in lowering the handle to the tool body during wire insertion (or termination) is generally normal to the axis of the cable to be terminated. Thus, various embodiments translate the generally normal force into a lateral force. Pivot pin 147 stops at the end of a recess (not shown) in housings 115 and 120, and thus stops further lateral movement of the finger pull 131 (as well as the associated actuation member and pusher.) It should be noted in other embodiments the actuation member may be indistinct from any pusher and/or finger pull, a finger pull may be dispensed with entirely, etc.

FIG. 3 also shows cable 6, cable manager 2, and connector 8 in receiving slot 150. Cable 6 is comprised of a plurality of wires and it is those wires which will be terminated into insulation displacement slots of contacts in connector 8 via cable manager 2, as is further described below. Cable slot 121 in housings 115 and 120 provide for pass through of cable 6. It should be noted that the width of cable slot 121 is, in the preferred embodiments, larger than the diameter of the cable that the apparatus is designed to terminate.

Figure 4:
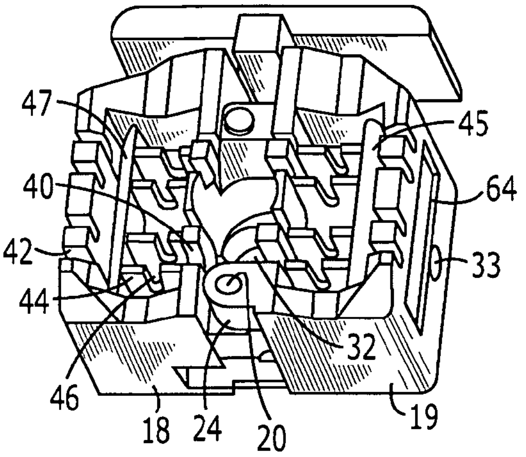
FIG. 4 shows a view of the embodiment of FIG. 3.

Turning to FIG. 4, a view of cable manager 2 is seen. Housings 18 and 19 are hingeably interconnected by means of hinge pin 20 passing through aligned holes in pivot pin lugs (e.g. 24) projecting from housings 18 and 19. This allows the cable manager to open to allow positioning of the cable for termination as well as removal of the cable manager after termination. Recess 32 provides a pass through for a cable. Outer wall positioning slots (e.g. 42) and inner wall positioning slots (e.g. 40) provide a space for the wires of the cable to be terminated. Each inner wall positioning slot is aligned with an outer wall slot. The width of the wire positioning slot is, in the preferred embodiments, designed to snugly accommodate a wire including its insulation covering.

A wire pushing wall (e.g. 44) extends adjacent to each pair of aligned inner and outer slots (e.g. 40 and 42.) Each wire pushing wall includes a U-shaped slot (e.g. 46) which permits a corresponding insulation displacement contact to be engaged with the wire to be terminated. Spring pin 33 depends through housing 19 into recess 32 in order to assist in securing the cut off blade. Wire identification recess 64 provides color markings which correspond to the colors of the insulation on the wires to be laced through particular slots, in order to assist an operator. Cutting blades 45 and 47 cut the wires once terminated, as is further described below.

Figure 5:
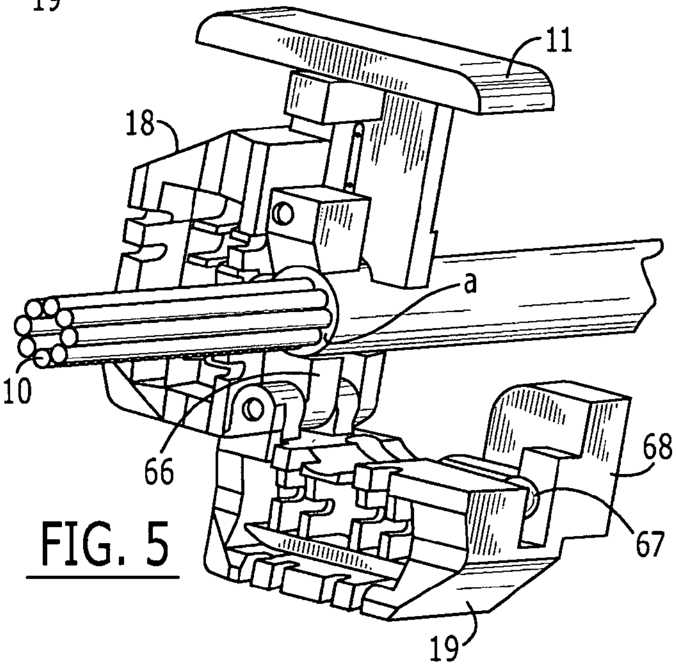
FIG. 5 shows another view of the embodiment of FIG. 4.

Turning to FIG. 5, a cable 6 is shown inserted within cable manager 2, which is shown partially open. The outer jacket has been stripped to expose the wires 10 using the measurement scale 122 and stripping blade described above and further described below. Edge a of cable 6 is aligned with shelf 66 of cable manager 2. Ball detent 67 is partially shown. Ball detent 67 engages a recess within cable clamp 11 (not shown here—see FIG. 6) thus assisting in closure of cable manager 2 about a cable to be terminated. Cable boss 68 engages cable slot 121 when cable manager 2 is inserted within tool 110 (shown in FIG. 1) and thus assures proper orientation of the manager and connector within the tool, and also retains the cable manager within the tool during storage and transportation of the tool. In other embodiments, other orientation methods and/or apparatus may be used.

Figure 6:
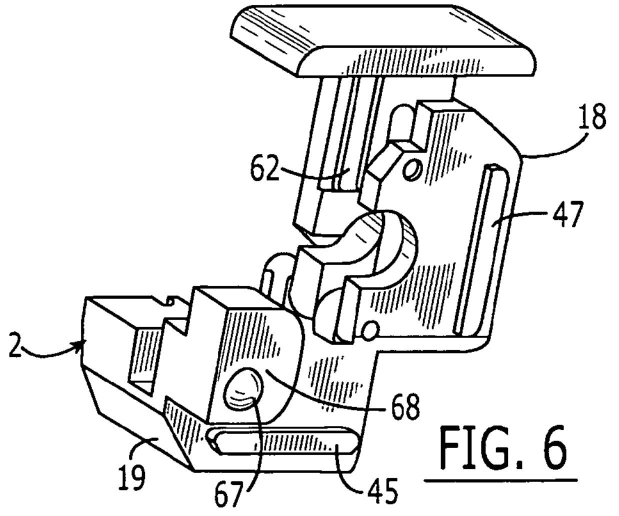
FIG. 6 shows another view of the embodiment of FIG. 4.

FIG. 6 shows a view of cable manager 2, without cable, from the side opposite that of FIG. 5. Here ball detent 67 is seen, as is recess 62 for ball detent 67 when the cable manager 2 is closed. Ball detent 67 will snap into recess 62, and thus a secure closure of the cable manager is provided. Other embodiments may use other integral security mechanisms for the cable manager as well. Cutting blades 45 and 47 are shown as well. They may be accessed by this side for replacement in various embodiments, if desired.

Once the cable 6 is inserted into cable manager 2, the cable manager is closed, with ball detent 67 snapping within recess 62. The cable is clamped in place within the manager. The cable is held by frictional force provided, at least in part, by the operator grasping surface 11 of the cable manager (shown in FIG. 4) which acts as a cable clamp.

Figure 7:
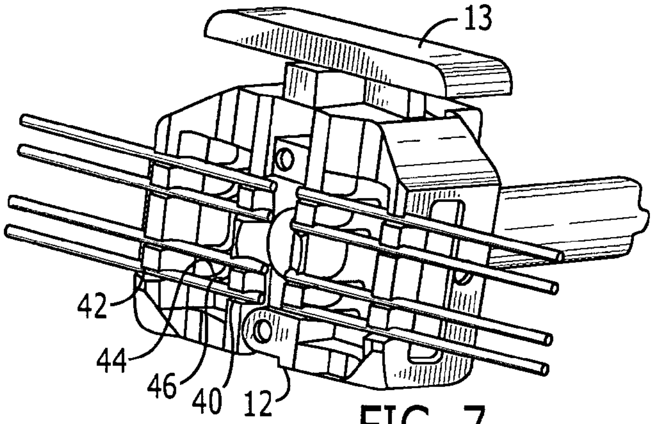
FIG. 7 shows another view of the embodiment of FIG. 4.

FIG. 7 shows a closed cable manager with the wires of cable 6 spread within the manager and aligned within a pair of inner and outer slots (e.g. 40 and 42.) A wire pushing wall (e.g. 44) and slot (e.g. 46) extends underneath the wire to be terminated. The cable manager is preferably held on surface 12 and opposing surface 13 of the cable manager 2.

Figure 8:
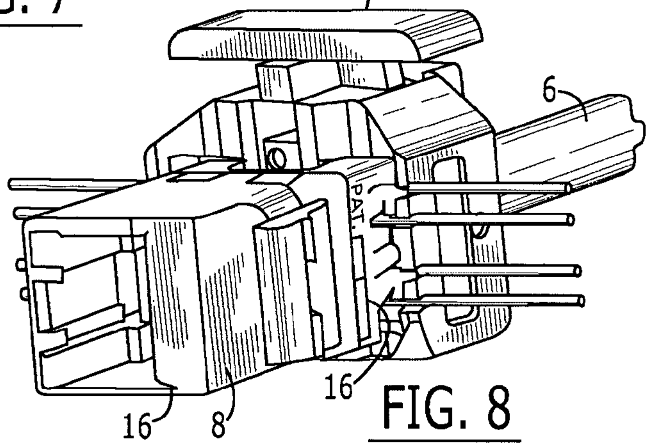
FIG. 8 shows another view of the embodiment of FIG. 4.

FIG. 8 shows a connector 8 which will be used to terminate cable 6. It should be noted that in various embodiments, various engagement mechanisms, or none, may be used depending upon the connector to be used for termination. The connector 8 to be used to terminate the cable 6 in this embodiment has a mating face 16. Contacts, each with an insulation displacement slot, project from a connection end opposite to that of the mating end. The connector is partially engaged with the wires by pushing the connector's connection end slightly into the cable manager 2.

Projections on the connector 8 provide a close sliding fit within recesses on cable manager 2 thereby aligning the contacts with contact portions of the wires. A connector and cable manager used in the various embodiments may be complementarily configured so that the connector can only be engaged with the cable manager in one orientation. Alternatively the cable manager can bear a label or other indicator for showing the connector-cable manager orientation.

The connector and cable manager are then placed in tool 110, as shown in FIG. 3. The cable 6, in this embodiment, includes eight wires. Other embodiments may of course use cables and connectors having differing numbers of wires and contacts. Especially preferred embodiments are preferably adapted to terminate category 5 and/or category 6 cable with a shielded or unshielded connector modular jack.

The cable manager 2 and connector 8 are then placed in the tool 110 with the pusher 135 in a retracted position. The handle 140 is then squeezed so that the pusher moves laterally and thereby forces the connector 8 fully into engagement with the cable manager 2. The body of squeezing tool 110 provides the opposing force for the terminal insertion into a connector. As this occurs, each wire is pushed further into the appropriate slot in one of the insulation displacement contacts. This process is assisted by the presence of one of the pushing walls 44 that is situated adjacent to the contact portion of each of the wires. Lug 143 acts as a handle stop to provide a means of identification to the operator that the tool has inserted the wires to the maximum depths obtainable with the tool and the connector is installed onto stationary wires. The cutting blades 45 and 47 will also extend into a cutting position and sever the wires. The force used in squeezing the handle to the tool body is generally normal to the axis of the cable to be terminated. Thus, various embodiments translate the generally normal force into a lateral force in order to accomplish termination.

The handle 140 is released and the cable manager 2 and connector 8 are removed from the squeezing tool 110. The cable manager is removed from the cable 6 by first pulling the connector out of the cable manager. The cable moves through the cable manger as the connector is removed. Next, the housings 18 and 19 are pulled apart, thus snapping ball detent 67 out of recess 62 and rotating the housings about pin 20. Free ends of the wires which have been severed from the remaining portions thereof and which may be retained in the slots of cable manager 2 can be pulled out there from for disposal. Thus, it is possible to use this and other preferred embodiments with only one hand, both to perform the wire insertion into a connector and to cut off any excess wire. The cut off of the wires is accomplished substantially simultaneously by way of the cutting blades of the cable manager. Those blades are reciprocally mounted relative to the cable manager. They are movable within the manager, for example, from a non-cutting position to a cutting position, by means of pressure against the end, as shown for example in FIG. 6. This allows for the blades to slide in the non-cutting position when the wires.

Figure 9:
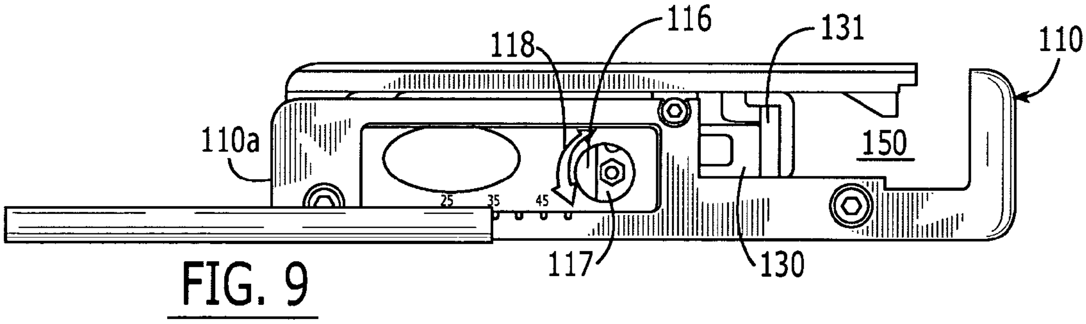
FIG. 9 shows another view of the embodiment of FIG. 1.

As had been described above, the cable may first be stripped of its outer jacket to expose the inner wires, if desired. Measurement of the stripping distance may be accomplished by holding the cable at end 110*a* of tool 110, as shown in FIG. 9. The appropriate length is determined by placing the free end of the cable at the desired strip length as indicated by scale 122. The cable is held by the operator at the point adjacent to surface 110*a* to mark the length.

Finger pull 131 is then used to pull actuator 130 towards recess 150, thus moving stripping blade 117 sufficiently clear of recess 116 to insert the cable. The cable is then inserted the appropriate distance into stripping recess 116, e.g., the length the operator had determined as described above. Finger pull 131 is then released and the force imposed by compression spring 128 will apply pressure via blade 117 to the insulation of the cable. The tool 110 is rotated about the cable axis, thus providing a cut to the insulation about the cable. Indicator 118 shows the direction of the minimum and maximum cut. Rotation in the direction of the larger arrow of indicator 118 will cut deeper than rotation in the direction of the smaller area of indicator 118. Finger pull 131 is once again used to pull actuator 130 toward recess 150 thus moving stripping blade 117 sufficiently clear of recess 116 to remove the cable. The cable is then pulled from the recess, and the stripped insulation removed if necessary. The exposed wires are then fed into the cable manager, as is described more fully above.

Figure 10:
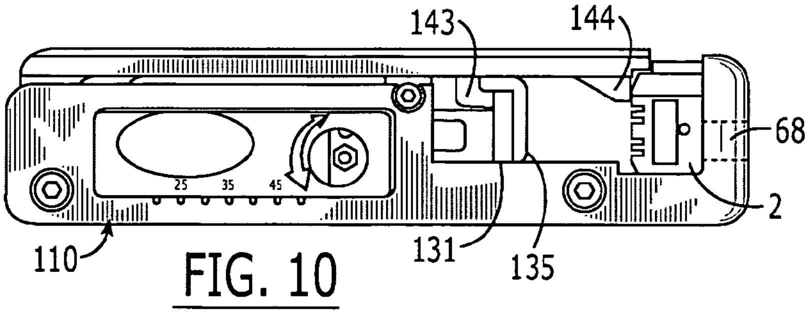
FIG. 10 shows a preferred embodiment.

It should also be noted that the cable manager may be stored on the tool when not in use. FIG. 10 shows cable manager 2 retained within recess 150 of tool 110. Lug 144 and cable boss 68 assist in retaining the manager securely within the tool.

A strain relief member and/or metal shield (not shown) may also be applied to the connector after termination. Additionally, a connector may include a dust cover. In use, more than one wire could be inserted into a particular terminal and/or not all terminals may be engaged by a wire.

The cable manager and/or apparatus of the preferred embodiments may be made of suitable plastic and/or metals and can accordingly be reused.

The above description and the views and material depicted by the figures are for purposes of illustration only and are not intended to be, and should not be construed as, limitations on the invention.

Moreover, certain modifications or alternatives may suggest themselves to those skilled in the art upon reading of this specification, all of which are intended to be within the spirit and scope of the present invention as defined in the attached claims.

I claim:

1. An apparatus for terminating a plurality of wires of a cable with a connector, wherein the wires are positioned relative to one another within a wire manager, wherein the apparatus comprises:

a tool body having a receiving slot configured to receive the connector therein and configured to receive the wire manager therein;

an actuation member received within said tool body and movable within said receiving slot for engaging a complementary surface of the connector, said actuation member configured to move the connector relative to the wire manager so as to guide terminals of the connector into electrically contacting relationship with the plurality of wires held within the wire manager; and a handle operatively coupled to said actuation member for moving said actuation member within said receiving slot, wherein said actuation member is configured to urge the connector into full engagement with the wire manager.

2. An apparatus as in claim 1, wherein said handle uses a squeezing force normal to the axis of the wires in order to urge the connector into full engagement with the wire manager.

3. An apparatus as in claim 1, wherein said receiving slot is configured to secure the wire manager in a fixed position, said actuation member moveable along an actuation member axis, said actuation member being configured to move the connector along the actuation member axis toward the wire manager until the connector is in full engagement with the wire manager.

4. An apparatus as in claim 1, wherein said tool body comprises a cable slot opening to said receiving slot, said cable slot being configured to receive the cable when the wire manager is received in said receiving slot.

5. An apparatus as in claim 1, wherein said actuation member comprises a pusher element at an end of said actuation member, said pusher element having a planar surface engaging the connector.

6. An apparatus as in claim 1, wherein said tool body further comprises:

a stripping recess extending from an exterior of said tool body; and a stripping blade movable within said stripping recess.

7. An apparatus as in claim 6, wherein said stripping blade is coupled to said actuation member and moveable by said handle.

8. An apparatus as in claim 1, wherein said handle comprises a handle locking lug and said actuation member comprises an actuation member lug, said handle locking lug engaging said actuation member lug to secure said handle in a locked position.

9. An apparatus as in claim 1, wherein said handle is moveable between an open position and a closed position, said handle comprises an engagement lug configured to engage the wire manager when said handle is in the closed position.

10. An apparatus as in claim 9, wherein the wire manager is retained within said receiving slot when said handle is in the closed position.

11. An apparatus for terminating a plurality of wires of a cable with a connector, wherein the apparatus comprises:

a wire manager having wire positioning slots configured to secure the plurality of wires therein, said wire manager having a mating end configured to mate with a connection end of the connector;

a tool body having a receiving slot configured to receive the connector and said wire manager therein;

an actuation member received within said tool body and movable within said receiving slot for engaging a complementary surface of the connector, said actuation member configured to move the connector toward said mating end of said wire manager so as to guide terminals of the connector into electrically contacting relationship with the wires held within said wire manager; and a handle operatively coupled to said actuation member for moving said actuation member within said receiving slot, wherein said actuation member is configured to urge the connector into full engagement with the wire manager.

12. An apparatus as in claim 11, wherein said handle uses a squeezing force normal to the axis of the wires in order to urge the connector into full engagement with said wire manager.

13. An apparatus as in claim 11, wherein said receiving slot is configured to secure said wire manager in a fixed position, said actuation member moveable along an actuation member axis, said actuation member being configured to move the connector along the actuation member axis toward said wire manager until the connector is in full engagement with said wire manager.

14. An apparatus as in claim 11, wherein said tool body comprises a cable slot opening to said receiving slot, said cable slot being configured to receive the cable when said wire manager is received in said receiving slot.

15. An apparatus as in claim 11, wherein said actuation member comprises a pusher element at an end of said actuation member, said pusher element having a planar surface engaging the connector.

16. An apparatus as in claim 11, wherein said tool body further comprises:

a stripping recess extending from an exterior of said tool body; and a stripping blade movable within said stripping recess.

17. An apparatus as in claim 16, wherein said stripping blade is coupled to said actuation member and moveable by said handle.

18. An apparatus as in claim 11, wherein said handle comprises a handle locking lug and said actuation member comprises an actuation member lug, said handle locking lug engaging said actuation member lug to secure said handle in a locked position.

19. An apparatus as in claim 11, wherein said wire manager comprises a clamp movable between an open position and a closed position wherein said clamp is configured to be clamped around the cable in the closed position, said clamp having a ball detent configured to engage a portion of said wire manager when said clamp is in the closed position to secure the cable within said wire manager.

20. An apparatus for terminating a plurality of wires of a cable with a connector, wherein the apparatus comprises:

a wire manager having wire positioning slots configured to secure the wires therein, said wire manager having a mating end configured to mate with a connection end of the connector;

a tool body having a receiving slot configured to receive the connector and said wire manager therein;

an actuation member received within said tool body and movable within said receiving slot for engaging a complementary surface of the connector so as to guide terminals of the connector into electrically contacting relationship with the wires; and a handle operatively coupled to said actuation member for moving said actuation member within said receiving slot, wherein said actuation member is configured to urge the connector into full engagement with the wire manager, wherein said handle is moveable between an open position and a closed position, said handle comprises an engagement lug configured to engage said mating end of said wire manager when said handle is in the closed position.

* * * * *